United States Patent
Stellet et al.

(10) Patent No.: US 12,174,693 B2
(45) Date of Patent: Dec. 24, 2024

(54) SAFEGUARDING A SYSTEM AGAINST FALSE NEGATIVES

(71) Applicant: Robert Bosch GmbH, Stuttgart (DE)

(72) Inventors: Jan Stellet, Stuttgart (DE); Michael Egert, Gerlingen (DE); Nils Tiemann, Ludwigsburg (DE); Stefan Aulbach, Leonberg (DE); Wolfgang Branz, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 92 days.

(21) Appl. No.: 17/866,845

(22) Filed: Jul. 18, 2022

(65) Prior Publication Data

US 2023/0025819 A1    Jan. 26, 2023

(30) Foreign Application Priority Data

Jul. 23, 2021   (DE) ...................... 10 2021 207 931.8

(51) Int. Cl.
    *G06F 11/07*    (2006.01)
(52) U.S. Cl.
    CPC ...... *G06F 11/0763* (2013.01); *G06F 11/0739* (2013.01)
(58) Field of Classification Search
    CPC ..................... G06F 11/0763; G06F 11/0739
    See application file for complete search history.

(56) References Cited

U.S. PATENT DOCUMENTS

| | | | |
|---|---|---|---|
| 10,379,994 B1* | 8/2019 | Giles ................... | G06F 11/0781 |
| 10,809,936 B1* | 10/2020 | Kaushik ................... | G06N 5/04 |
| 2008/0129518 A1* | 6/2008 | Carlton-Foss ....... | G08B 25/009 379/45 |
| 2016/0342453 A1* | 11/2016 | Khan ................... | G06F 11/0793 |
| 2017/0010930 A1* | 1/2017 | Dutta ................... | G06F 11/0772 |
| 2017/0010931 A1* | 1/2017 | Agarwal ............. | G06F 11/0787 |
| 2018/0060159 A1* | 3/2018 | Justin ................... | G06F 11/0751 |

(Continued)

FOREIGN PATENT DOCUMENTS

| | | |
|---|---|---|
| DE | 102010013243 A1 | 9/2011 |
| DE | 102015215380 A1 | 2/2017 |

(Continued)

*Primary Examiner* — Joseph O Schell
(74) *Attorney, Agent, or Firm* — NORTON ROSE FULBRIGHT US LLP; Gerard A. Messina

(57) ABSTRACT

A computer-implemented method for safeguarding a system against false negatives. The method includes: receiving a time series of a criticality, the system including a functionality that is triggered when the criticality meets a first predetermined criterion; computing a time series of a reference, the reference being a comparison criticality for triggering the functionality; computing a time series of an error measure based on the time series of the criticality and the time series of the reference, a non-triggering of the functionality being classified as a false negative when a portion of the time series of the error measure meets a second predetermined criterion; and identifying at least one near-false negative, a non-triggering of the functionality of the system being classified as a near-false negative when a portion of the time series of the error measure meets a third predetermined criterion, but not the second predetermined criterion.

21 Claims, 8 Drawing Sheets

(56) References Cited

U.S. PATENT DOCUMENTS

| | | | |
|---|---|---|---|
| 2018/0324199 A1* | 11/2018 | Crotinger | G06F 16/285 |
| 2019/0066061 A1* | 2/2019 | Rencher | G06Q 10/06315 |
| 2019/0095266 A1* | 3/2019 | Chen | G06N 20/00 |
| 2019/0129768 A1* | 5/2019 | Novogran | G06F 11/3037 |
| 2020/0134194 A1* | 4/2020 | Youngberg | G06F 21/563 |
| 2020/0167640 A1* | 5/2020 | Sundareswara | G06N 20/10 |
| 2023/0236926 A1* | 7/2023 | Justin | G06F 11/0787 |
| | | | 714/4.1 |
| 2024/0197208 A1* | 6/2024 | Chretien | A61B 5/1114 |

FOREIGN PATENT DOCUMENTS

| | | |
|---|---|---|
| DE | 102018209250 A1 | 12/2019 |
| DE | 102020118412 A1 | 3/2021 |
| DE | 102020124693 A1 | 4/2021 |

\* cited by examiner

SAFEGUARDING A SYSTEM AGAINST FALSE NEGATIVES

BACKGROUND INFORMATION

A technical system may have a functionality that is triggered for example, under a certain condition (for example, according to the first predetermined criterion; see below). Such a certain condition is frequently a function of boundary conditions and/or surroundings data of the system, which are detected by sensors of the system or a further system, for example, and subsequently processed. Based, for example, on time series of sensor data and/or data that have been derived from sensor data, at any point in time it may be checked whether the certain condition is met, and thus whether the functionality of the system is to be triggered.

The system may be exposed to surroundings that may change during operation of the system. Thus, for example, the system may be a driving system, in particular a driving system of a vehicle, whose surroundings dynamically change during travel. Via the boundary conditions and/or surroundings data, an attempt is generally made to acquire a certain automated understanding of the surroundings in order to allow a decision concerning whether the triggering of the functionality of the system at a certain point in time represents an appropriate system response. What constitutes an appropriate system response may be a function, for example, of a specification of the system and/or the interaction with the surroundings. Even when numerous and/or different sensors are used for detecting the surroundings (for computer vision, for example), the automated understanding of the surroundings represents an open context problem, since the surroundings may generally change essentially arbitrarily. Thus, even when generalizing algorithms (machine learning algorithms, for example) are used, an incorrect automated understanding may not be completely ruled out.

Thus, as a function of the quality of the automated understanding of the surroundings (and/or of the certain condition), a triggering of the functionality of the system at a certain point in time may be correct or incorrect: if the functionality of the system at the certain point in time is rightly triggered (for example, from the perspective of a fairly reasonable observer), a true positive is present. In contrast, if the functionality of the system at the certain point in time is wrongly triggered (likewise from a fairly reasonable perspective, for example), a false positive is present. In addition, non-triggering of the functionality of the system at the certain point in time may be correct or incorrect, depending on the quality of the automated understanding of the surroundings (and/or of the certain condition): if the functionality of the system at the certain point in time is rightly not triggered (for example, from the perspective of a fairly reasonable observer), a true negative is present. In contrast, if the functionality of the system at the certain point in time is wrongly not triggered (likewise from a fairly reasonable perspective, for example), a false negative is present.

Ideally, during operation the system should have the fewest possible number of false positives and the fewest possible number of false negatives. Therefore, the development of the system or of the functionality of the system is often already directed toward reducing false positives and/or false negatives or largely eliminating them. While on the one hand it is expressly desired to avoid false positives and/or false negatives to the greatest extent possible during operation of the system, on the other hand the fewer false positives and/or false negatives that are (or may be) measured in release tests, the more difficult it is to demonstrate the low false positive rates and/or false negative rates in such release tests. As a result, release tests often represent long, complicated endurance tests. A release for the system or for the functionality of the system may be granted, for example, when in at least one endurance run, i.e., over a certain time period, it has not been possible to establish a false positive and/or a false negative (or a corresponding frequency is below a specific threshold).

The safeguarding of the system against false positives and/or against false negatives is particularly important in safety-critical systems, in particular when an inappropriate system response generated by a false positive or a false negative may cause irreparable damage (for example, accidents resulting in bodily injury or death). For example, the system may be a safety-critical driver assistance system (DAS) or an automated driving system, in particular a highly automated driving system (HADS). The functionality of such a system, such as an emergency braking assistant (autonomous emergency braking (AEB)), may be directed here toward collision avoidance. In another example, in particular for HADSs, the functionality of the system for collision avoidance may also include evasive maneuvers or combined braking and evasive maneuvers. Prior to market entry, such systems must be safeguarded (i.e., validated) against risks due to incomplete system specifications. Depending on the safety architecture, this safeguarding may also be necessary on various safety layers. For the safeguarding, extensive test runs (endurance runs) are typically carried out. Alternatively or additionally, virtual test driving may be simulated. However, due to the complexity and diversity of environmental influences, and the numerous and often unknown driving situations, the safeguarding of surroundings-detecting DASs or HADSs in such virtual test runs (simulations) may be inadequate, in particular when the simulation itself could not be validated or could only be insufficiently validated, and thus does not satisfactorily represent reality.

Often, accident avoidance systems, such as an emergency braking assistant or a system for collision avoidance in the HADS, are allowed to make an intervention into the vehicle guidance (for example, an emergency braking maneuver/ emergency evasive maneuver) only in a few (and exceptional) situations.

Risks for the vehicle in which the system is implemented, as well as for other road users, may arise, for example, in the event of unjustified interventions (false positives), for example when the system in a preceding vehicle unjustifiably initiates an emergency braking operation and a rear-end collision is thus caused. The maximum tolerable rate (false positive rate) at which an unjustified intervention is allowed to occur is generally a function of the severity of the intervention and of the controllability, and may be ascertained using an objectified hazard and risk analysis, for example. In general, it may be assumed that false positives are in no case allowed to occur more frequently than true positives. The endurance run performance to be carried out may be determined as a function of the allowable false positive rate. For example, no false positives may then be observed during the endurance run. Often, only the (non) occurrence of unjustified triggerings is assessed, and no in-depth assessment of the system, for example at system-internal interfaces, is made. Because (near-)accidents occur only infrequently during the actual driving operation, very low rates of occurrence or long time intervals between two false positives are to be demonstrated in release tests.

However, risks for the vehicle in which the system is implemented, as well as for other road users, may also arise due to missed interventions that would have been justified and necessary, i.e., occur due to false negatives, for example when the system in the vehicle fails to carry out adequate braking that would have been justified and necessary to prevent a rear-end collision with a preceding vehicle that is decelerating intensely. In addition, a late intervention may be classified as a missed intervention, and thus as a false negative, based on the point in time at which the intervention should have taken place. The maximum tolerable rate (false negative rate) at which a justified intervention is allowed to be missed is generally a function of the type of system and the surroundings employed. In general, it may be assumed that false negatives may in no case occur more frequently than typical accident rates in the employed area. An accurate target value is under discussion by professionals in the field, and in any case is present for very low false negative rates that are to be demonstrated. Often, the safeguarding against false negatives of the system is checked only for some systems (automatic emergency braking, for example) based on dedicated tests on the test course (EuroNCAP, for example), without a direct indication of the performance in actual traffic events. For HADSs, a large data volume is introduced, which, however, is generally not sufficient for statistical proof or an indication that would be required for safeguarding a realistic necessary target value. The endurance run performance to be carried out may be determined as a function of the allowable false negative rate.

SUMMARY

A first general aspect of the present invention relates to a computer-implemented method for safeguarding a system against false negatives. According to an example embodiment of the present invention, the method may include receiving a time series of a criticality, it being possible for the system to include a functionality that is triggered when the criticality meets a first predetermined criterion. The method may also include computing a time series of a reference, it being possible for the reference to be a comparison criticality for triggering the functionality of the system. The method may also include computing a time series of an error measure, based at least on the time series of the criticality and the time series of the reference, it being possible for a non-triggering of the functionality of the system to be classified as a false negative when a portion of the time series of the error measure meets a second predetermined criterion. The method may also include identifying at least one near-false negative, it being possible for a non-triggering of the functionality of the system to be classified as a near-false negative when a portion of the time series of the error measure meets a third predetermined criterion, but not the second predetermined criterion.

A second general aspect of the present invention relates to a computer-implemented method for safeguarding a/the system against false negatives, which may be carried out independently of or subsequently to the computer-implemented method according to the first general aspect (or a specific embodiment thereof), the system including a/the functionality that may be triggered when a/the criticality meets a/the first predetermined criterion, and it being possible for the system to include a system of subsystems that includes at least one subsystem. According to an example embodiment of the present invention, the method may include receiving, for each subsystem of the system, a time series of a subcriticality, it being possible for the criticality to be a function of the subcriticalities of the subsystems of the system, the criticality optionally being a function of whether or to what extent at least one subcriticality meets an associated first predetermined subcriterion. The method may include computing, for each subsystem of the system, a time series of a subreference, the subreference in each case being a comparison subcriticality for the subcriticality of the subsystem. The method may also include computing, for each subsystem of the system, a time series of a suberror measure at least based on the time series of the subcriticality of the subsystem and the time series of the subreference of the subsystem, it being possible for a time series of a vector of suberror measures to be generated. An assessment error in a subsystem may be present when a portion of the time series of the suberror measure meets an associated second predetermined subcriterion (for example, one for each subsystem). A near-assessment error in a subsystem may be present when a portion of the time series of the suberror measure meets an associated third predetermined subcriterion, but not the associated second predetermined subcriterion. The method may also include identifying, for each subsystem of the system, at least one near-assessment error and/or at least one assessment error.

Alternatively, the method for safeguarding the system against false negatives according to the first general aspect of the present invention (or a specific embodiment thereof) may be carried out subsequently to the computer-implemented method for safeguarding the system against false negatives according to the second general aspect of the present disclosure (or a specific embodiment thereof).

A third general aspect of the present invention relates to a system that is safeguarded according to the computer-implemented method for safeguarding the system against false negatives according to the first and/or second general aspect (or a specific embodiment thereof).

As described in the related art, the safeguarding of the system against false negatives is important for reliable operation of the system and/or the surroundings of the system. Such safeguarding is more important, the more drastic the effects that a false negative may have for the system and/or its surroundings. The methods provided in this disclosure for safeguarding the system against false negatives according to the first and/or second general aspect (or a specific embodiment thereof) may be used for enabling the functionality or the system. Alternatively or additionally, during operation of the system, for example a driving system of a vehicle, the methods may be used for diagnostic purposes, i.e., for (continuous) monitoring. In this case, the methods for safeguarding the system against false negatives may be implemented, for example, in a control device (or in a control unit). Alternatively, the particular time series may also be transferred to a cloud server and evaluated by the cloud server. In this case, the methods described in this disclosure may be implemented in a computer system that includes, for example, at least one control unit in the system, the cloud server, and a corresponding network for data communication between the at least one control unit and the cloud server.

As likewise already described in the related art, non-triggerings and/or false negatives may be infrequent in the system. In particular in safety-critical systems, in particular in driving systems such as in an emergency braking assistant and/or evasive maneuver assistant for collision avoidance, a system often proves to be practical only when false negatives are infrequent and, for example, more infrequent than typical accident rates in the employed area. It may be considered to be a disadvantage of the low false negative rate (or false negative likelihood), even though it is rightly sought, that in an endurance test, for example, no or practically no false negatives can be measured. Therefore, extrapolating the actual false negative rate to the specified operating period of the system, in particular during the development period of the system, is possible, if at all, only with great error/great uncertainty. Nor can reliable extrapolations be carried out for a plurality of such systems (for example, a vehicle fleet in the field). Necessary enabling of the functionality and/or of the system is thus made more difficult.

One advantage of the methods provided in this disclosure according to the present invention for safeguarding the system against false negatives may be seen in that, in addition to false negatives, near-false negatives and/or, in addition to assessment errors in subsystems, near-assessment errors in subsystems may also be identified and evaluated. A near-false negative may represent a situation in which the system already shows signs of malfunctioning, but which has not yet manifested as a false negative. A near-assessment error in a subsystem may likewise represent a situation in which the subsystem already shows signs of malfunctioning, but which has not yet manifested as an assessment error. In fact, near-false negatives may occur more frequently than false negatives. As a result (due to a greater data volume), the false negative rate may be determined better and more accurately. In addition, the diagnosis during operation of the system may thus be improved. If near-false negatives, for example, accumulate, the user of the system (for example, an occupant or driver of the vehicle) may already be informed and warned before a false negative may arise and trigger a serious accident, for example. The warning may include, for example, an error display and/or a prompt for a service visit. In the case of a cloud server, for example a recognized false negative and/or a recognized near-false negative may be transmitted back into the system, in particular back into the driving system. The identification of a near-false negative thus represents an analysis of an operating state of a system. This may contribute to the identification of errors in the system.

Assessment errors in subsystems may, but do not have to be, infrequent (at least not as infrequent as false negatives). The more subsystems the system includes and/or the more different the subsystems of the system are, the more likely different assessments of the particular subsystems, and thus assessment errors, may be. For example, a system may include at least two subsystems (a radar subsystem and a video subsystem, for example), it being possible for the criticality to result from an OR fusion of the subcriticalities of the subsystems. In such an OR fusion, which may be used in particular in safety-critical systems, the functionality of the system is triggered, for example, only when at least one of the subsystems decides on a triggering, based on the particular subcriticality. Therefore, false negatives are rather unlikely here. On the other hand, configurations are entirely possible in which, for example, one subsystem decides against a triggering, while at least one other subsystem decides for the triggering. In this case, an assessment error is then present in at least one subsystem.

In any case, in subsystems, near-assessment errors may in turn occur more frequently than assessment errors. Near-assessment errors and/or assessment errors may likewise be taken into account in the computation of the false negative rate. The accuracy of or the confidence in the false negative rate may thus be further increased. Assessment errors and/or near-assessment errors in subsystems may also be taken into account during operation of the system. For example, a subsystem may be deactivated when assessment errors and/or near-assessment errors become more frequent in the subsystem (for example, when a camera sensor is soiled and the camera subsystem can no longer analyze meaningful images). Assessment errors may be more frequent than false negatives, and/or near-assessment errors may be more frequent than near-false negatives. By taking into account assessment errors and/or near-assessment errors, a greater data volume may (thus) result, on the basis of which the computation of the false negative rate and/or the diagnosis may take place. By use of the method according to the second general aspect (or a specific embodiment thereof), the safeguarding against false negatives and in addition the system understanding may thus also be improved at the subsystem level.

One option for recognizing near-false negatives and/or near-assessment errors may be based on the fact that time series for the criticality, the reference, and/or the error measure or for the subcriticalities, the subreferences, and/or the suberror measures are (quasi)continuous, i.e., nonbinary, for example. For example, intermediate states between triggering and non-triggering, between true negatives and false negatives, etc., may thus be analyzed and assessed.

While, on the one hand, the methods provided in this disclosure according to the first and/or second aspect of the present invention (or a specific embodiment thereof), as described, may be utilized to increase the data volume, the methods on the other hand may also be used to shorten the endurance tests necessary for the enabling (for example, to generate in shortened endurance tests the same data volume/ conclusive results as in the related art). Effort and/or costs in the development may thus be saved. In addition, it may be advantageous to compare near-false negatives and/or near-assessment errors in systems of projects that are different, but occasionally similar (in subsequent applications, for example). Such comparisons may be particularly advantageous when the system is in an early phase of development, and sufficient endurance run data are not yet available.

The provided method according to the second aspect of the present invention (or a specific embodiment thereof) may be advantageously applied (here, for example, without the provided method according to the first aspect) when the allowable false negative rate according to one specification, for example, is so low that endurance tests would have to have a duration that is no longer technically and/or economically feasible, or that, for example, in a tightly scheduled product development cycle is sometimes no longer achievable at all. The provided method according to the second aspect of the present invention (or a specific embodiment thereof) may also be advantageously applied when, for example, in the provided method according to the first aspect of the present invention (or a specific embodiment thereof) it has been shown that the number of false negatives and/or near-false negatives is too low to reliably compute the false negative rate. Such a circumstance may occur with greater likelihood the more advanced the state of development of the system is. The provided method according to the second aspect of the present invention (or a specific embodiment thereof) may also be advantageously applied when, for example, in the provided method according to the first aspect of the present invention (or a specific embodiment thereof) it has been shown that for near-false negatives, stratifications or inhomogeneities have occurred in the error measure.

Stratifications or inhomogeneities may be due to the fact, for example, that the distribution of the error measure of the situations results from at least two distributions (for example, from suberror measures of at least two subsystems of the system). For example, a stratification/inhomogeneity may be present when the error measures of the observed near-false negatives are distributed over a noncontiguous subset (for example, distributed over two or more disjunct clusters of error measures) of a set/an interval of error measures. Alternatively or additionally, a stratification/inhomogeneity may be present, for example, when the adaptation of the distribution function to the error measures of the situations is not satisfactory (although there is reason to assume that the modeling is correct). Stratifications/inhomogeneities may occur in fusion systems (for example, OR fusion), for example. In the method according to the second aspect of the present invention (or a specific embodiment thereof) of the present invention, situations of similar error measures (for example, the disjunct clusters of error measures) may then often be associated with assessment errors and/or near-assessment errors in one of the subsystems. The subsystems may thus be optimized in a targeted manner in order to further reduce the false negative rate and thus make the system more robust. In addition, design decisions for subsequent applications may be derived therefrom.

DETAILED DESCRIPTION OF EXAMPLE EMBODIMENTS

Figure 1A:
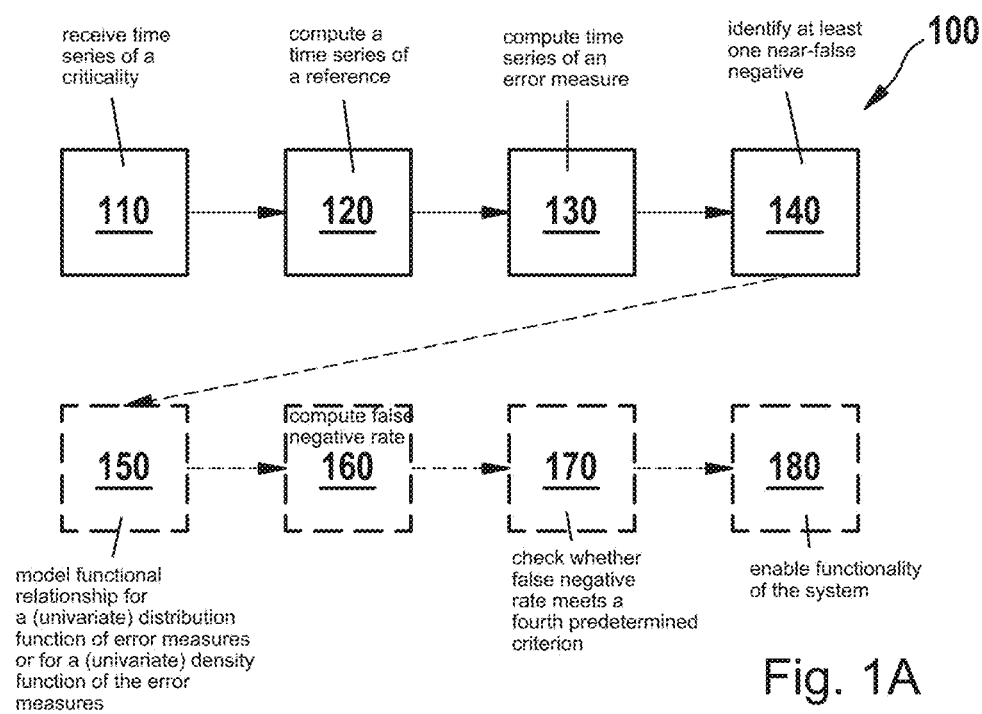
FIGS. 1A through 1C schematically illustrate a computer-implemented method for safeguarding a system against false negatives according to the first aspect of the present invention (or a specific embodiment thereof).

Methods 100, 101 provided in this disclosure are directed toward safeguarding a system 200 against false negatives of a functionality of the system. As discussed in the related art, a false negative is a non-triggering of the functionality, although from the viewpoint of a fairly reasonable observer, for example, this should have taken place. A missed triggering of the functionality may thus be a false negative. Even a late intervention, based on the point in time at which the intervention should have taken place, may be classified as a missed intervention and thus as a false negative. In the following discussion, a false negative may be referred to as a critical event or as a critical situation.

A computer-implemented method 100 for safeguarding a system 200 against false negatives is initially provided, which may include receiving 110 a time series of a criticality KRIT, it being possible for system 200 to include a functionality that may be triggered when the criticality (at a point in time of the time series of the criticality; or a portion of the time series of the criticality, for example the most recent three points in time of the time series) meets a first predetermined criterion. At each point in time of the time series, criticality KRIT may be encoded by at least two numerical values (for example, binary: 0 and 1; or tertiary: 0, 1, and 2; or using a plurality of numerical values, for example in MATLAB vector notation: [0.00:0.01:1.00]). In other words: the criticality may be regarded as a numerical measure which, based on the first predetermined criterion, is crucial for a triggering or a non-triggering. However, high values of the criticality do not have to involve a triggering (namely, as a function of the first predetermined criterion). In the context of driving systems whose functionality is directed toward collision avoidance, the criticality may be derived, for example, from variables such as time to collision (TCC), a scaled deceleration that is necessary for accident avoidance (brake threat number (BTN)), and/or a time/distance-based metric for situation assessment. If the first predetermined criterion is met by the criticality (at a point in time of the time series or by a portion of the time series of the criticality), a triggering of the functionality follows. In contrast, if the first predetermined criterion is not met by the criticality, a non-triggering follows. For example, the first predetermined criterion may be met when criticality KRIT exceeds a first predetermined threshold value at one or multiple chronologically successive points in time of the time series of criticality KRIT. At each point in time of the time series, criticality KRIT may be a multidimensional numerical measure which, based on the first predetermined criterion, is crucial for a triggering or a non-triggering. In other words, the time series of criticality KRIT may be multidimensional. The multidimensional numerical measure (at each point in time of the time series) may include a vector, a matrix, and/or a tensor, for example. Alternatively, the multidimensional time series of the criticality may include one-dimensional time series (one for each component of the multidimensional time series).

Method 100 may also include computing 120 a time series of a reference REF, it being possible for reference REF to be a comparison criticality for a triggering of the functionality of system 200. At each point in time of the time series, reference REF may likewise be encoded by at least two numerical values (for example, binary: 0 and 1; or tertiary: 0, 1, and 2; or using a plurality of numerical values, for example in MATLAB vector notation: [0.00:0.01:1.00]). In particular, reference REF may be encoded in the same way as criticality KRIT. Such encoding may be advantageous, since it may then be checked, according to the same first predetermined criterion, whether a triggering would have been justified. It is advantageous when the reference (see below) encodes a fairly great system understanding, for example with regard to time and/or via an extra sensor system. At each point in time of the time series, reference REF (and analogous to criticality KRIT, for example) may be a multidimensional numerical measure. In other words, the time series of reference REF may be multidimensional. The multidimensional numerical measure (at each point in time of the time series) may include a vector, a matrix, and/or a tensor, for example. Alternatively, the multidimensional time series of the reference may include one-dimensional time series (one for each component of the multidimensional time series).

Method 100 may also include computing 130 a time series of an error measure TPI (also: overall system TPI), at least based on the time series of criticality KRIT and the time series of reference REF, it being possible for a non-triggering of the functionality of system 200 to be classified as a false negative when a portion (for example, the most recent point in time or the most recent three points in time of the time series) of the time series of error measure TPI meets a second predetermined criterion. Alternatively, the error measure (technical performance indicator (TPI)) may also be referred to as an assessment measure. For example, the second predetermined criterion may be met when error measure TPI at one or multiple chronologically successive points in time of the time series of error measure TPI exceeds a second predetermined threshold value (also: error threshold value ($\vartheta_0$)). Alternatively or additionally, the second predetermined criterion may be met when the time series of error measure TPI includes a local extreme (for example, a maximum above a further second threshold value). At each point in time of the time series, error measure TPI may likewise be encoded by at least two numerical values (for example, binary: 0 and 1; or tertiary: 0, 1, and 2; or using a plurality of numerical values, for example in MATLAB vector notation: [0.00:0.01:1.00]).

Error measure TPI computed from criticality KRIT and reference REF may be regarded as statistically evaluatable information concerning the potential malfunctioning of the system. In other words, the two variables KRIT, REF may be linked here to an intelligent rule for an error measure TPI which, for example, in the example of the first, second, and third predetermined criteria with respective thresholds, may meet at least the following conditions:

If no error of the system is present, the TPI may be small or may correspond to a selected standard value (for example, TPI=0). For example, in the system (an AEB system, for example), the case KRIT≥REF would be noncritical and would be mapped onto TPI=0, provided that only false negatives and not false positives are to be assessed. KRIT≥REF may mean that the system classifies a situation as more critical than would be objectively justified. Accordingly, this case tends to result in a triggering preferentially taking place (for example, in an AEB, that an emergency braking operation would be triggered), although it was not justified.

For constant KRIT and increasing REF the TPI may increase, and for decreasing REF the TPI may decrease.

For constant REF and increasing KRIT the TPI may decrease, and for decreasing KRIT the TPI may increase.

If the TPI exceeds the second predetermined threshold value, this may be an erroneous response by the system (i.e., a false negative).

In principle, these conditions may be met by a plurality of functions. Therefore, a suitable function may be selected which, using suitable parameters, for example, may ensure that the partly subjective falseness of a criticality is mapped in a present situation. For example, an AEB system is considered which initiates an emergency braking operation for KRIT values greater than the first predetermined threshold value (0.9 or 1, for example). Then, for example, the question must be answered concerning which TPI value is assigned to a situation having criticality 0.4 and reference 0.6, and whether some other situation having criticality 0.7 and reference 0.9 is to obtain the same value. In both cases, although the difference between KRIT and REF is identical, in the second situation, on the one hand the system is closer to a triggering based on the higher KRIT value, and on the other hand, to a large extent the triggering could also be justified due to the relatively high REF value.

Figure 4A:
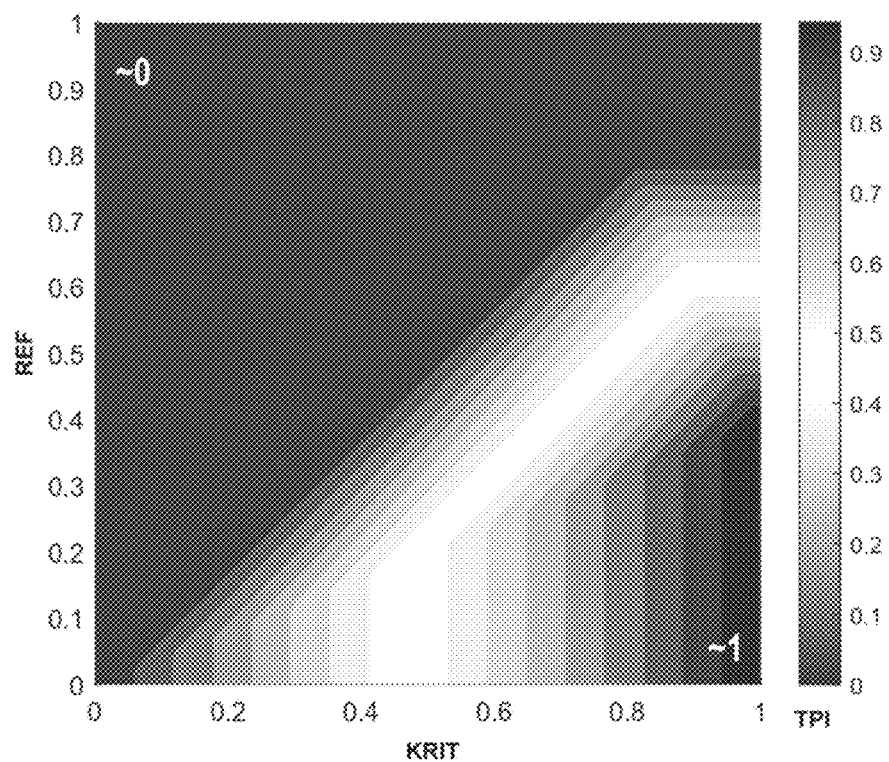
FIGS. 4A through 4B depict examples of functional relationships of an error measure as a function of criticality and reference, according to an example embodiment of the present invention.
Figure 4B:
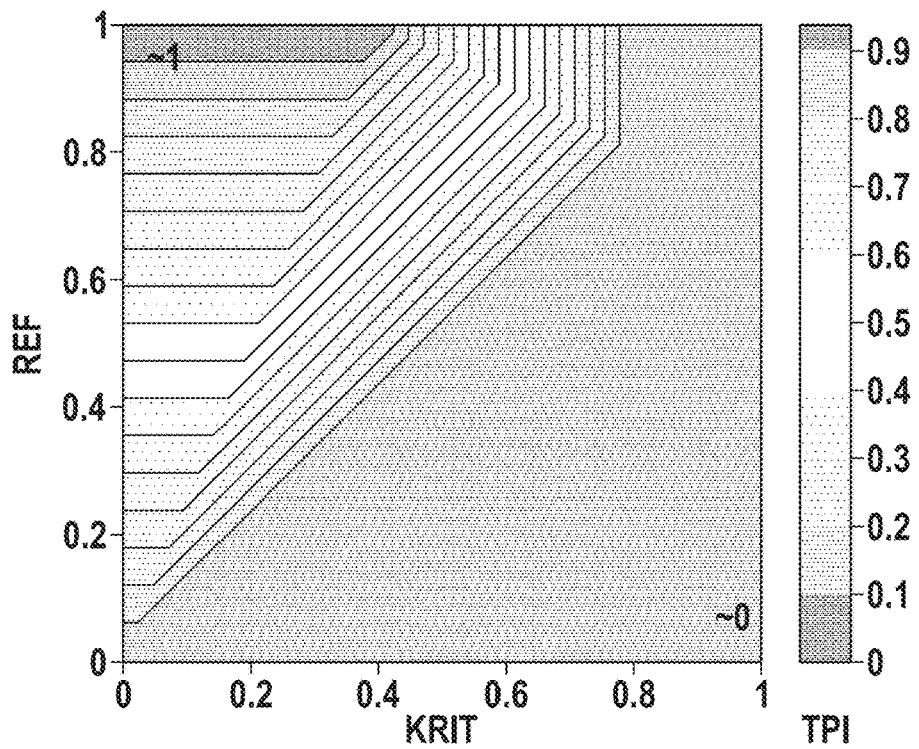

As an example, computing 130 the time series of error measure TPI may take place as follows:

$$\vartheta(KRIT, REF) = \max\left[\min\left(REF, \frac{p_3 - KRIT}{p_3 - p_2}, \frac{REF - KRIT}{p_1}\right), 0\right]$$

where $\vartheta$ may be the error measure and $p_1$, $p_2$, $p_3$ may be predetermined parameters. Such a functional relationship for $p_1=0.6$, $p_2=0.4$, $p_3=0.8$, for example, is depicted in FIG. 4B (where the hatching for ~0 would have to be darker as is shown in the legend). A different functional relationship (for example, for an inverted TPI, for a different second and third predetermined criterion) is illustrated in FIG. 4A.

Method 100 may also include identifying 140 at least one near-false negative (also referred to as a subcritical event or subcritical situation), it being possible for a non-triggering of the functionality of system 200 to be classified as a near-false negative when a portion (for example, the most recent point in time or the most recent three points in time of the time series) of the time series of error measure TPI meets a third predetermined criterion, but not the second predetermined criterion. For example, the third predetermined criterion may be met when error measure TPI at one or multiple chronologically successive points in time of the time series of error measure TPI exceeds a third predetermined threshold value (also: near-error threshold value) and, for example, does not exceed the second predetermined threshold value (the error threshold value). Alternatively or additionally, the third predetermined criterion may be met when the time series of error measure TPI includes a local extreme (for example, a maximum above a further third threshold value).

The term "near-false negative" may be understood in such a way that "near" refers to "false negative" as a whole. A near-false negative may in particular (and according to definition) be a non-triggering.

Figure 1B:
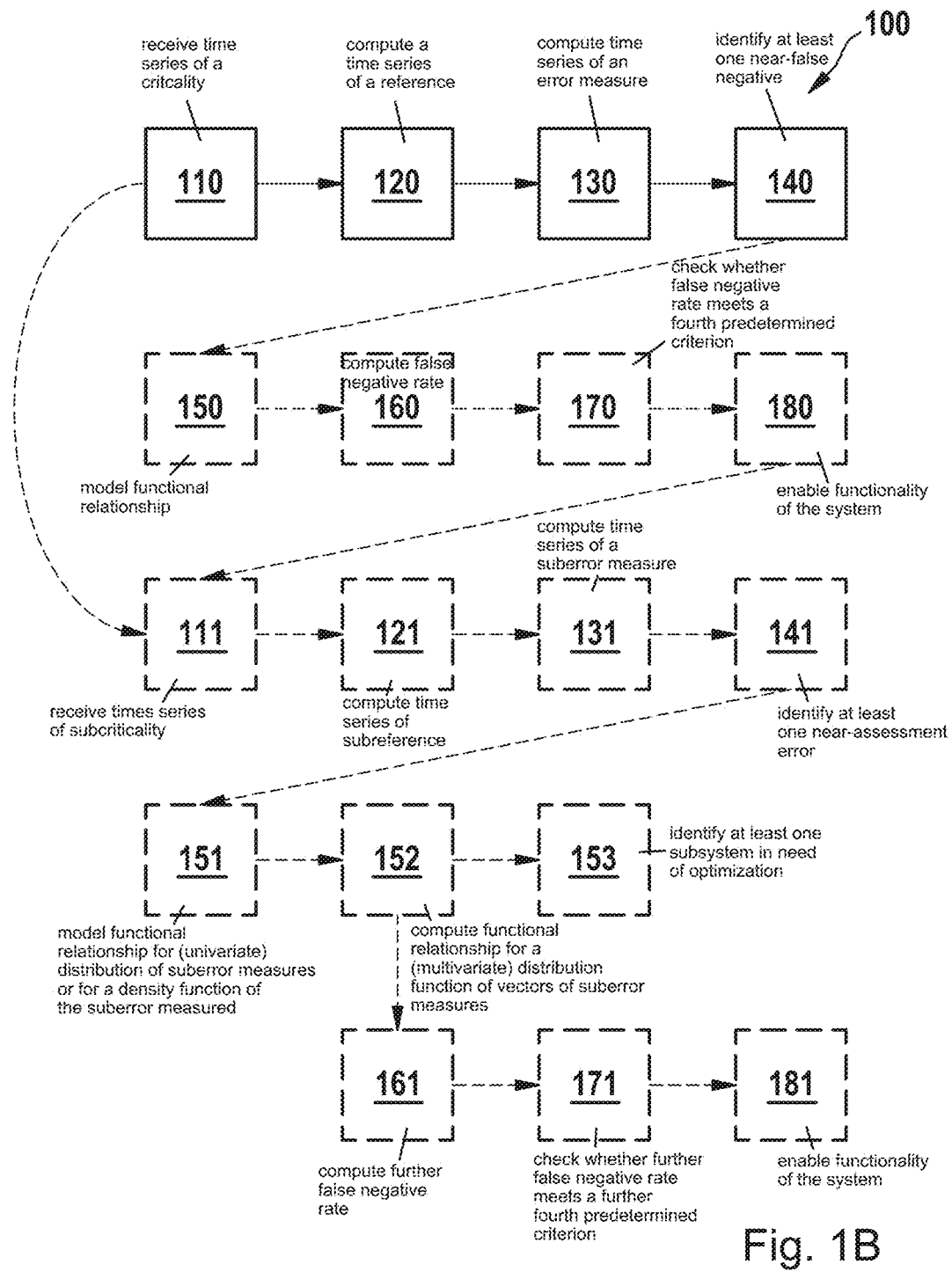
Figure 1C:
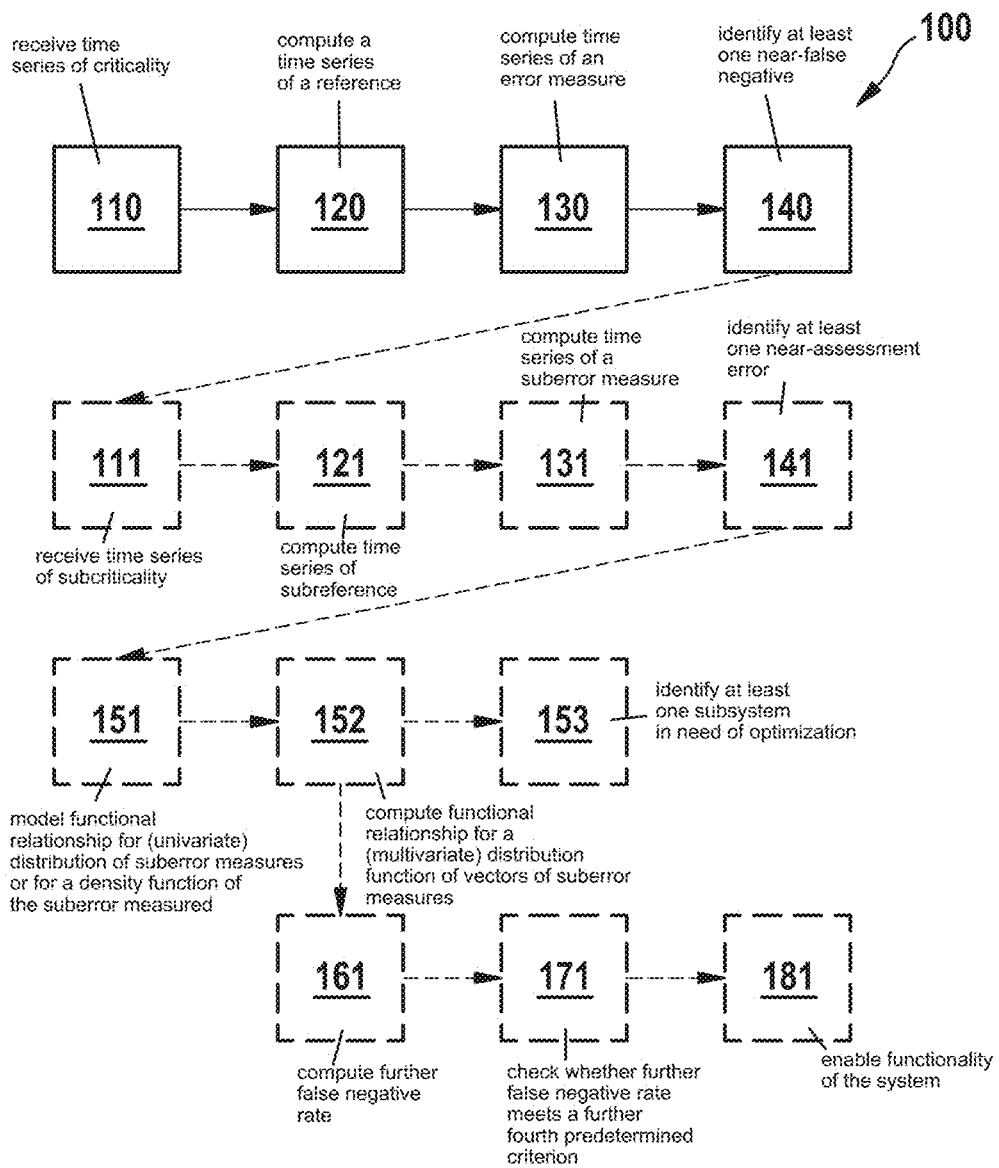

FIGS. 1A through 1C schematically illustrate computer-implemented method 100 for safeguarding the system against false negatives according to the first aspect (or a specific embodiment thereof). Unlike the illustration, for example steps 110 and 120 may take place in an arbitrary order, the same as steps 111 and 121, which are optional in this case.

The time series of criticality KRIT may be (quasi)continuous. Alternatively or additionally, the time series of reference REF may be (quasi)continuous. Alternatively or additionally, the time series of error measure TPI may be (quasi)continuous. A time series may be continuous when the values (i.e., KRIT, REF, and/or TPI here) may lie in a continuum, for example in an interval of the real numbers (for example, [0, 1]).

Alternatively, a continuum, or more precisely a quasicontinuum, may also be provided by a sufficiently large number of discrete values in a real interval. For example, the numerical values [0.00:0.01:1.00] in the MATLAB vector notation may be regarded as a (quasi)continuum. For a time series, a further continuity in time, for example in equidistant (100-Hz clocking, for example) or nonequidistant time intervals, is also typically provided. In addition, in some systems a (quasi)continuous criticality KRIT may be utilized to establish an intensity of the triggering of the functionality of the system; i.e., the intensity of the triggering (for example, a braking force in an AEB system) may sometimes be a function of a portion (for example, the most recent point in time or the most recent three points in time of the time series) of (quasi)continuous criticality KRIT at the point in time of the intervention decision. For example, the greater the criticality, the higher the braking force that may be selected.

The at least one near-false negative may be used in a diagnosis during operation of system 200. As a result, the control of the system may be influenced and/or a user of the system may be informed and/or warned. System 200 may be a driving system, optionally a driving system of a vehicle. The driving system may be a driver assistance system (DAS, for example AEB) or an automated driving system, in particular a highly automated driving system (HADS). In particular in safety-critical and/or surroundings-detecting systems (for collision avoidance, for example), the safety of the system, its users, and/or the surroundings of the system may be increased as a result of the diagnosis.

Alternatively, system 200 may be a system that is not necessarily a driving system. Such a system may be an alarm system, for example, whose functionality includes triggering an alarm. This system may likewise be safety-critical and/or surroundings-detecting (via at least one sensor system).

Figure 5:
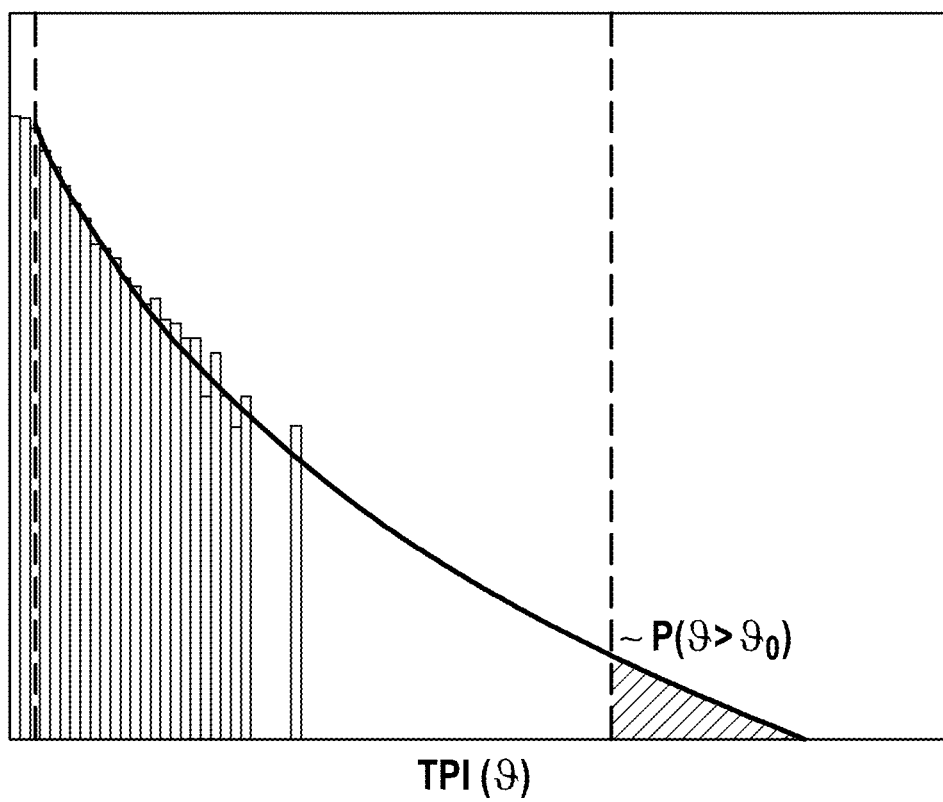
FIG. 5 depicts a computation (extrapolation) of the false negative rate based on a distribution function of the error measures.

As illustrated in FIGS. 1A through 1B, method 100 may also include modeling 150 a functional relationship for a (univariate) distribution function of error measures, or for a (univariate) density function of the error measures, at least based on the at least one near-false negative. For example, parameters of a parametric (univariate) distribution function may be adapted to the at least one near-false negative and/or, in practice, to a plurality of near-false negatives. One example of such modeling is illustrated in FIG. 5, the vertical bars indicating a (relative) frequency of near-false negatives, and a (constant, univariate) distribution function having been adapted. FIG. 5 illustrates a density function of the distribution function.

As illustrated in FIGS. 1A through 1B, method 100 may also include computing 160 a false negative rate, based on the distribution function of the error measures over a set of (generic) error measures TPI, over which the second predetermined criterion is met. In other words, the distribution function of the error measures may be evaluated over a set of critical events. For example, this set of error measures TPI, as illustrated in FIG. 5, may be defined by all error measures that are above the second predetermined threshold (i.e., above error threshold value $\vartheta_0$). The false negative rate may be used, for example, to compare the system to false negative rates of other systems that are possibly already enabled and/or successfully tested. The combination of modeling 150 of the functional relationship for the distribution function, and the evaluation over the set of the critical events, may be referred to as extrapolation, since no false negatives have to be measured, and a statement about their likelihood is still possible. The extrapolation is particularly meaningful when the time series of error measure TPI is (quasi)continuous.

The functional relationship may be a parameterizable statistical model, optionally a parameterizable statistical model from extreme value theory. For selecting the functional relationship of the distribution function of the error measures, i.e., the statistical models, it may be crucial that critical events as well as subcritical events occur in the system only infrequently, and that both types of events may be described, for example, by particularly large/small values or extreme values of a variable (in the present case, the TPI) and/or local extremes of the TPI, for example by exceeding/falling below a particular suitable high/low threshold value. In such a case, a family of general, nonsystem-specific statistical models from extreme value theory may be relied on for the extrapolation. In general, statistical models (probability distributions, for example) for describing the distribution of system errors may be specific for a system and therefore are not generalizable. However, since the objective here in particular is to carry out an extrapolation for particularly infrequently occurring error events, only those intervals of the error measure that are sufficiently close to the critical threshold value, and thus assumed to have only a very low likelihood (subcritical events), may be relevant. Under these prerequisites, general statistical properties of infrequent events may be relied on instead of system-specific models. In particular, maximum values of an error measure within sufficiently long recording intervals (block maxima) or exceedances of a sufficiently highly selected threshold (peaks-over-threshold) may be described by so-called extreme value models, for example using so-called extreme value distributions or generalized Pareto distributions. The validity of the extrapolation is coupled to the validity of the assumed statistical model for the error measure. If an appropriate model is identified, the associated model parameters may be adapted to the system, based on the measured profiles of error measure TPI. The adapted model then describes the likelihood at which the error measure exceeds a predefined value. The extrapolation involves using the model to allow a prediction to be made concerning how frequently a critical error occurs (for example, when second predetermined threshold value/error threshold value $\vartheta_0$ is exceeded), although such an error does not have to be present in the introduced endurance run data.

In addition, as illustrated in FIGS. 1A through 1B, method 100 may include checking 170 whether the false negative rate (and/or an upper limit of a confidence interval for the false negative rate) meets a fourth predetermined criterion. The method may also include enabling 180 the functionality of system 200 when the false negative rate meets the fourth predetermined criterion, the fourth predetermined criterion optionally being met when the false negative rate (and/or the upper limit of the confidence interval for the false negative rate) is less than a predetermined allowable rate. Thus, method 100 provides a quantifiable enabling criterion that may be utilized in the development of the system (for HADSs, for example) and/or also during operation of the system (for example, in a vehicle including a driver assistance system).

Figure 2A:
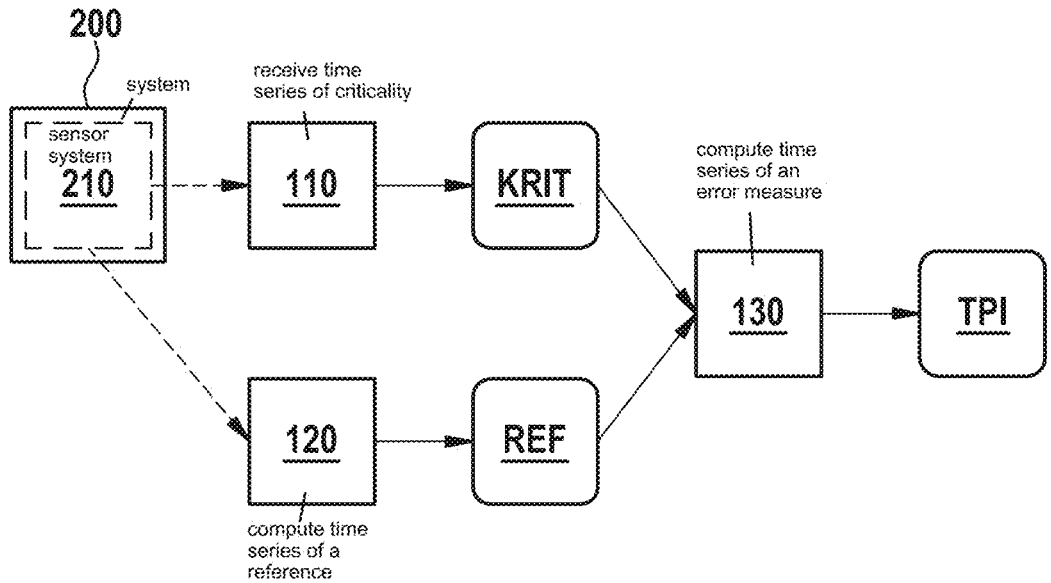
FIGS. 2A through 2B show examples of dependencies of the criticality or of the reference on a sensor system and/or a further sensor system, according to an example embodiment of the present invention.

Method 100 may also include receiving a data time recording (a vehicle data time recording, for example) of system 200, the data time recording optionally including at least one time series of data that is based on measurement with the aid of a sensor system 210 of system 200. As schematically illustrated in FIG. 2A, receiving 110 the time series of criticality KRIT may include receiving the time series of criticality KRIT from the data time recording. For example, in the case of a driving system, the time series of criticality KRIT may be received via at least one (CAN) interface of the driving system. In general, the data time recording may be a data time recording of one or multiple endurance tests of the system, it being possible for the system to be activated and/or deactivated. The data time recording may also be carried out and processed live during operation, or may have already been carried out at a previous point in time. An advantage of receiving the time series of criticality KRIT from the data time recording is provided when the criticality corresponds exactly to the criticality that is responsible for the triggering and/or non-triggering decision during operation of the system. It may thus be ensured that the actual functionality of the system is validated.

Alternatively or additionally, receiving 110 the time series of criticality KRIT may include computing the time series of criticality KRIT, based on the data time recording. At each point in time of the time series, criticality KRIT may be a function of data of the data time recording at the same point in time. Alternatively or additionally, at each point in time of the time series, criticality KRIT may be a function of data of the data time recording at at least one previous point in time. In other words, in this case the criticality may be a function only of the present (i.e., the most recent point in time, for example) and/or of the past.

As schematically illustrated in FIG. 2A, computing 120 the time series of reference REF may likewise be based on the data time recording. At each point in time of the time series, reference REF may be a function of data of the data time recording at the same point in time. Alternatively or additionally, at each point in time of the time series, reference REF may be a function of data of the data time recording at at least one previous point in time. Alternatively or additionally, at each point in time of the time series, reference REF may be a function of data of the data time recording at at least one subsequent point in time. In other words: in this case the reference may be a function of the present, the past, and/or the future. Since the reference in particular may on the one hand be a function of at least one data point of the future, the reference may be computed only in a time-delayed manner (i.e., not at the point in time of the intervention decision). On the other hand, the reference may thus assess an event/a situation better than the criticality, since how the event/the situation has developed may thus be taken into account. The reference may thus represent a more meaningful criticality comparison for the criticality, and may correspond to a viewpoint of the fairly reasonable observer. In many cases, a time delay of a few seconds (for example, <1 s, <2 s, <5 s, <10 s, <30 s, <60 s) may be sufficient to be able to conclusively assess the event/the situation. Such time delays may still prove to be useful in the diagnosis, in particular for information and/or warning purposes, also during operation of the system. Alternatively, method steps 110, 120, 130, unlike the illustration in FIG. 2A, may also be carried out within system 200.

Figure 2B:
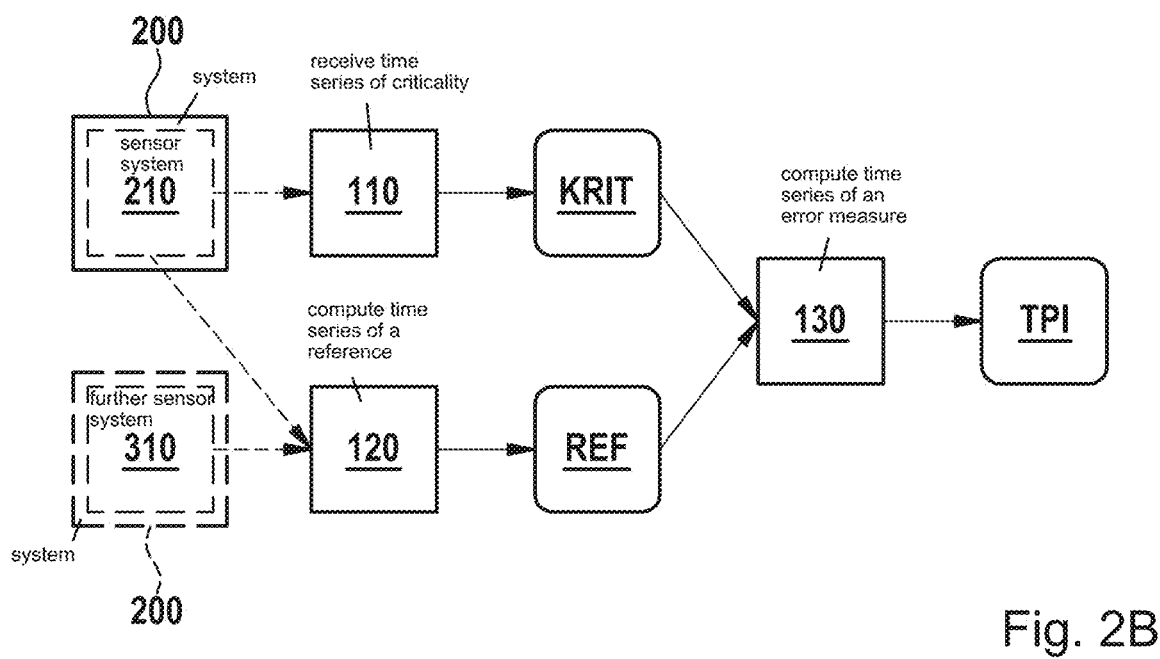

As schematically illustrated in FIG. 2B, method 100 may also include receiving a further data time recording, the further data time recording optionally including at least one further time series of data based on further measurement with the aid of a further sensor system 310. However, the further sensor system does not have to be part of the system. For example, the further sensor system may be a special system for the system to be tested in endurance runs. The further sensor system may contribute to the reference corresponding to a viewpoint of the fairly reasonable observer. Alternatively, method steps 110, 120, 130, unlike the illustration in FIG. 2B, may also be carried out within system 200.

Method 100 may also include forming an overall data time recording from the data time recording and/or the further data time recording. Computing 120 the time series of reference REF may be based on the overall data time recording (i.e., on the vehicle data time recording and/or the further vehicle data time recording). At each point in time of the time series, reference REF may be a function of data of the overall data time recording at the same point in time. Alternatively or additionally, at each point in time of the time series, reference REF may be a function of data of the overall data time recording at at least one previous point in time. Alternatively or additionally, at each point in time of the time series, reference REF may be a function of data of the overall data time recording at at least one subsequent point in time. Since the reference, for example in contrast to the criticality, may alternatively or additionally be a function of the further sensor system, the reference may assess an event/a situation better than the criticality, and thus becomes an even more meaningful criticality comparison for the criticality. In particular, it has been proven to be advantageous that the computation of the reference may be automated. As a result, even long endurance tests may be efficiently evaluated and analyzed with regard to the false negative rate.

In one exemplary specific embodiment of an AEB system in which no surroundings sensor data are required, the pieces of information concerning the actual behavior of the vehicle in the future may be utilized (via vehicle state sensors, for example) to subsequently assess whether the estimation of the criticality (and thus the triggering/non-triggering) has been correct. Although in the case of post-simulations of actual endurance tests, for example, the functionality is not (actually) active and thus cannot intervene, it is still possible to analyze here what the system would have done. Assuming that the system decides, based on a criticality of 0.4 (on a criticality scale of 0 to 1), an intervention/a triggering according to the criticality of 0.4 (for example, a braking operation with 40% brake pressure) were to be applied now (at a point in time t=0, for example) to avoid an accident, for example because the system believes to have recognized that a preceding vehicle is lightly braking and a response must be made, it may be analyzed whether the driver, in a time period of t=0 to approximately t=3 s, for example, has actually carried out a braking maneuver with a similar intensity (for example, corresponding to the criticality of 0.4). This information may then be taken into account in a reference (reference A) at point in time t=0.

For example, if the driver has not responded at all during this time period, 40% criticality may be regarded as inappropriate and thus incorrect. Reference A at point in time t=0 (or at a later point in time) may then be set to 0, for example. For the TPI at point in time t=0, for example a value of 0.4 may be computed/defined here.

In contrast, for example if the driver has responded very intensely, for example carried out an emergency braking operation, the criticality may be assessed as excessively low, or for example an overreaction of the driver may be attested. In both cases, an excessively high criticality was not present. Reference A at point in time t=0 (or at a later point in time) may then be set to 1, for example. For the TPI at point in time t=0, for example a value of 0 may be computed/defined here.

For example, at any point in time (t=0, for example) reference A may be determined as follows:

For times in the future, for example t=(0.1, 0.2, . . . , 3.0), for example in seconds, a speed reduction from point in time 0 to point in time t may be computed.

Based on an existing braking model (taking into account latency, maximum jerk, etc.), it may be computed what criticality the system would output to be able to carry out such a speed reduction from point in time 0 to t. As a result, at each point in time a reference candidate may be computed from t=(0.1, 0.2, . . . , 3.0).

For example, for reference A at point in time t=0, the reference value may then be computed as the maximum of all reference candidates of points in time t=(0.1, 0.2, . . . , 3.0). Such a procedure may be advantageous, since it is taken into account here that the driver may possibly respond earlier or later, and thus acted with less or more force. It may also be checked whether the driver has also responded nonlongitudinally (i.e., laterally), for example by veering laterally into another lane. For this purpose, it may be checked whether the driver has carried out a lateral movement from t=0 to t=(0.1, 0.2, . . . , 3.0). Based on a profile of a steering angle from the (vehicle) data time recording, an additional cornering maneuver may possibly have to be taken into account.

With regard to the analysis of possible false negatives, the reference (reference A) as computed in this example may have gaps which, however, cannot be closed with an additional reference (reference B). In the above example, in which the criticality assesses an intervention of 40% as necessary, the driver may, however, respond more intensely than necessary. Reference A then results in a value that is higher than would have been objectively necessary. If the assessment of the criticality now took place using this value, the functionality would be wrongly accused of having predicted a criticality that is too low. In another example in which the functionality can/is intended to respond only to vehicles, for example the driver may brake heavily due to a pedestrian or a speed trap. Reference A thus obtains a high value, while the criticality should actually justifiably be 0 (since the reference is not intended to/cannot respond to these objects). In this case, it may be helpful to incorporate further data (within the meaning of a "second opinion") into the analysis to allow a check as to whether or not the actual maneuver of the driver is to be relevant for the functionality of the system. For this purpose, a further sensor system 310 (which, for example, does not have to be used in the series system and is used, for example, only in the endurance test with regard to the enabling of the system) may be used that is more complex than sensor system 210 conventionally used in the system, and/or may detect further data (for example, a further camera system for a different viewing angle). The maneuver may thus be assessed more reliably, and a more reliable reference (reference B) may be computed. In this way, for example an overreaction of the driver may then be resolved. Since reference B may be more accurate than the criticality, it may be compared to the criticality, and the error measure may be computed. The additional sensor system or the resulting reference sensor image may also be utilized for further computations, for example to enhance the data via so-called reverse tracking.

The following procedure may result:

If the driver does not respond, i.e., reference A is equal to 0, the entire reference may thus be set to 0. The maneuver may thus be assessed as unnecessary.

If the driver responds, the type of response (for example, an evasive maneuver/braking or a combination) may be determined. For the determined type of response, the values of reference A and of reference B may be evaluated.

The reference value may then be determined from the comparison of reference A and reference B. To recognize an overreaction and not incorrectly assess same, the minimum may be selected. However, other operations (a communication, for example) would also be possible.

Reference B may be reference REF, whose time series is computed in step 120 of computer-implemented method 100 for safeguarding the system against false negatives. Alternatively, computing 120 the time series of reference REF may include computing the reference from reference A and reference B.

Computing 130 the time series of error measure TPI may include computing the time series of the error measure in such a way that, at at least one point in time of the time series, error measure TPI is a function of different points in time of the time series for criticality KRIT and for reference REF.

Computing 130 the time series of error measure TPI may also be based on the data of the data time recording and/or of the overall data time recording.

As a result, temporal effects that may result in a difference in KRIT and REF may be taken into account. For an AEB, for example, if the system recognizes a specific criticality in the situation, but the driver does not de-escalate the situation until a short time later (and thus more intensely), previous KRIT was not too high, but instead was justified. This means that a temporal assignment of the KRIT and REF values may possibly be necessary in order to associate the same underlying event to the greatest extent possible. Such an association may take place, for example, by analyzing each time window for the criticality value. Method 100 may also include identifying at least one false negative, modeling 150 the functional relationship for the distribution function of the error measures, or for the (univariate) density function of the error measures, optionally also taking place based on the at least one false negative. If false negatives occur despite their infrequency, they may advantageously be utilized in the computation of the false negative.

Also provided is a computer-implemented method 100, 101 for safeguarding a/the system against false negatives (according to the second aspect), the system including a/the functionality that is triggered when a/the criticality meets a/the first predetermined criterion, and system 200 including a system of subsystems 220, 221, each including at least one subsystem 220. System 200 may include, for example, 1 subsystem (for example, the one subsystem may then be the system), more than 1, more than 2, more than 3, more than 4, more than 5, more than 10, or more than 20 subsystems. Method 100, 101 may include receiving 111, for each subsystem 220, 221 of system 200, a time series of a subcriticality KRIT1, KRIT2, it being possible for criticality KRIT to be a function of subcriticalities KRIT1, KRIT2 of subsystems 220, 221 of system 200. Criticality KRIT may be a function of whether or to what extent at least one subcriticality KRIT1, KRIT2 meets an associated (for each subsystem) first predetermined subcriterion. Alternatively, criticality KRIT may be a function of whether or to what extent all subcriticalities KRIT1, KRIT2 meet a respective associated first predetermined subcriterion. For example, criticality KRIT may be a function of whether or to what extent at least two subcriticalities KRIT1, KRIT2, KRIT3 each meet an associated (for each subsystem) predetermined first subcriterion ("2-out-of-3 fusion"). In addition, for example criticality KRIT may be a function of whether or to what extent at least m subcriticalities (KRIT1, KRIT2, . . . , KRITn) each meet an associated (for each subsystem) predetermined first subcriterion ("m-out-of-n fusion"), where m is less than or equal to n. In addition, for example criticality KRIT may be a function of whether or to what extent a combination of all subcriticalities or of a subset of the subcriticalities meets a predetermined (shared) first subcriterion. Examples may be the product of all subcriticalities, the product of the largest or smallest m subcriticalities, etc. In particular, it is then not absolutely necessary for one or multiple subcriticalities, per se, to meet an associated (for each subsystem) predetermined first subcriterion.

Time series of the subcriticalities, the same as the time series of the criticality, may be (quasi)continuous and/or may include an identical (possible) value range. In addition, in a (each) subsystem the time series of the subcriticality may be multidimensional (vector, matrix, or tensor, for example). The criticality may result, for example, from the product of the subcriticalities $$KRIT=KRIT1 \times KRIT2 \times \cdots$$

where in the case of at least one (quasi)continuous subcriticality a (quasi)continuous criticality may result. Alternatively, the criticality may result, for example, from an AND fusion of subcriticalities $$KRIT=KRIT1\ \&\ KRIT2\ \&\ \cdots$$

where a discrete (and binary) criticality results. In an alternative AND fusion, the criticality may result, for example, from $$KRIT=\min(KRIT1, KRIT2, \cdots)$$

where a (quasi)continuous criticality may result. Alternatively, the criticality may result, for example, from an OR fusion of subcriticalities $$KRIT=KRIT1 | KRIT2 | \cdots$$

where discrete (and binary) criticality results. In an alternative OR fusion, the criticality may result, for example, from $$KRIT=\max(KRIT1, KRIT2, \cdots)$$

where a (quasi)continuous criticality may result.

In addition, for example "mixed forms" may also arise, for example criticality KRIT being (quasi)continuous on one portion of its value range and discrete on another portion. However, the entire value range may also be discrete. Subcriticalities and/or suberror measures (see below) may in each case also have such a "mixed form." Furthermore, criticality KRIT, reference REF, and/or error measure TPI from method 100 according to the first general aspect (or a specific embodiment thereof) may in each case also have such a "mixed form."

Method 100, 101 may also include computing 121, for each subsystem 220, 221 of system 200, a time series of a subreference REF1, REF2, it being possible for the subreference in each case to be a comparison subcriticality for subcriticality KRIT1, KRIT2 of subsystem 220, 221. Time series of the subreferences, the same as the time series of the reference, may be (quasi)continuous and/or may include an identical (possible) value range. In addition, in a (each) subsystem the time series of the subreference may be multidimensional (vector, matrix, or tensor, for example). In fact, at least one time series of a subreference REF1, REF2 (or all time series of the subreferences) may be the time series of reference REF. This may be the case in particular when each subsystem, based on its subcriticality, makes the same triggering decision or non-triggering decision, for example in an AND fusion.

Method 100, 101 may also include computing 131, for each subsystem 220, 221 of system 200, a time series of a suberror measure TPI1, TPI2, at least based on the time series of subcriticality KRIT1, KRIT2 of subsystem 220, 221 and the time series of subreference REF1, REF2 of subsystem 220, 221, it being possible to generate (from the time series of the suberror measures of the subsystems) a time series of a vector from suberror measures. In other words, each component of the vector of suberror measures may include a suberror measure (also: subsystem TPI) of a subsystem. The vector of suberror measures may be referred to as an overall system TPI. Time series of the suberror measures, the same as the time series of the error measure, may be (quasi)continuous and/or may include an identical (possible) value range.

Figure 1D:
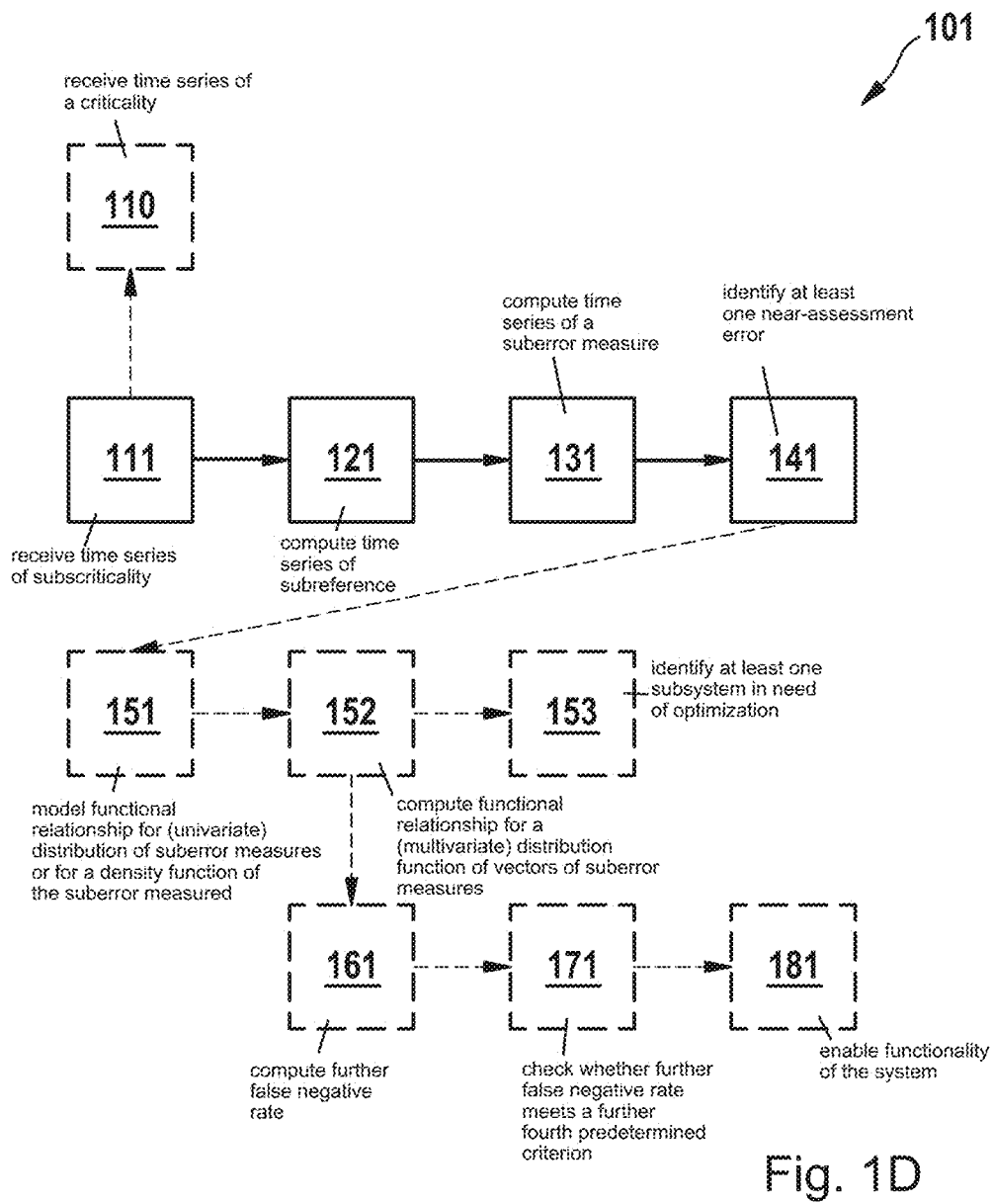
FIG. 1D schematically illustrates a computer-implemented method for safeguarding the system against false negatives according to the second aspect of the present invention (or a specific embodiment thereof).
Figure 3:
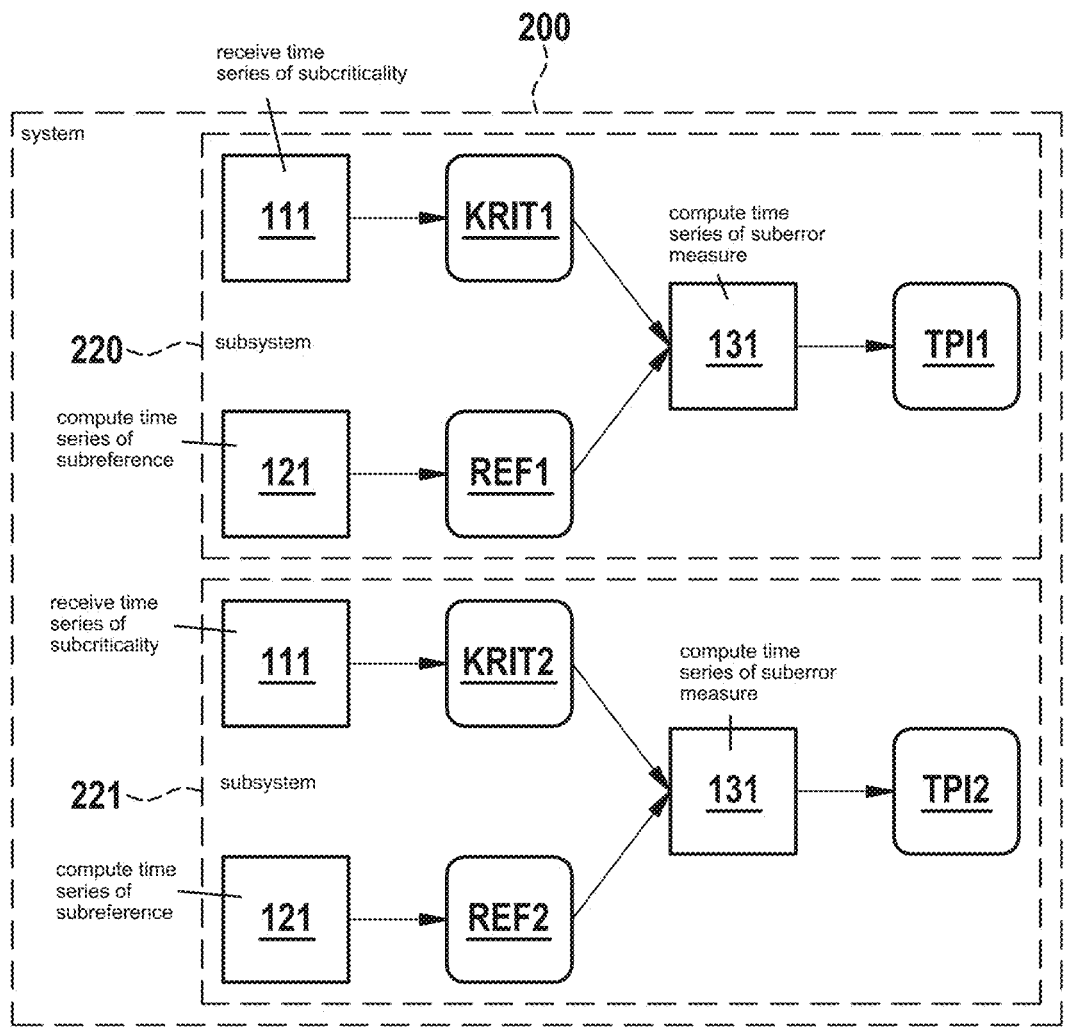
FIG. 3 illustrates a system that includes two subsystems, according to an example embodiment of the present invention.

Method 100, 101 (according to the second aspect) may be carried out independently of method 100 (according to the first aspect). Alternatively, method 100, 101 may be carried out in addition to, in particular subsequently to, method 100 (according to the first aspect). FIG. 1D schematically illustrates one exemplary specific embodiment of computer-implemented method 100, 101 for safeguarding the system against false negatives. A system 200 including two subsystems 220, 221 is schematically illustrated in FIG. 3. When method 100, 101 (according to the second aspect) is carried out independently of method 100 (according to the first aspect), method 100, 101, as illustrated in FIG. 1D, may include receiving 110 a time series of a criticality KRIT, system 200 including a/the functionality that is triggered when the criticality meets a/the first predetermined criterion. Receiving 110 the time series of criticality KRIT may include computing the time series of criticality KRIT from the time series of the subcriticalities for each subsystem of the system.

A critical subset that corresponds to a false negative may be defined in a vector space that is spanned by vectors of suberror measures. In other words, a false negative here may be broken down at the subsystem level. The critical subset, in particular in the case of the OR fusion, may be a first Cartesian product, for example $$[\vartheta_{1,0}, \infty] \times [\vartheta_{2,0}, \infty] \times \cdots$$

where $\vartheta_{1,0}$, $\vartheta_{2,0}$ represent suberror threshold values in a first or second subsystem. The critical subset, in particular in the case of the AND fusion, may be a complement of a first Cartesian product, for example of $$[-\infty, \vartheta_{1,0}] \times [-\infty, \vartheta_{2,0}] \times \cdots$$

where $\vartheta_{1,0}$, $\vartheta_{2,0}$ once again represent suberror threshold values in a first or second subsystem.

Furthermore, a subcritical subset in the vector space that is spanned by the vector suberror measures may be defined in such a way that each element of the subcritical subset is not an element of the critical subset, but in each case is near at least one element of the critical subset according to a predetermined distance criterion (based on the Euclidian distance, for example). Alternatively or additionally, the subcritical subset may be defined in such a way that it corresponds to the near-false negatives that are broken down at the subsystem level. Alternatively or additionally, the subcritical subset may be defined as the difference between the complement of a second Cartesian product $$[-\infty, \tilde\vartheta_{1,0}] \times [-\infty, \tilde\vartheta_{2,0}] \times \cdots$$

and the critical subset, where for example $\tilde\vartheta_{1,0} < \vartheta_{1,0}$ and $\tilde\vartheta_{2,0} < \vartheta_{2,0}$. This may correspond, for example, to the case that at least one subsystem includes a near-assessment error (cf. associated third predetermined subcriterion), and at the same time, none of the subsystems includes an assessment error (cf. associated second predetermined subcriterion). The subcritical subset may also be independent of the type of fusion. In this regard, the subcritical subset described here does not necessarily correspond to an OR fusion.

Alternatively or additionally, the union of the critical subset and the subcritical subset may be a second Cartesian product $$[\tilde\vartheta_{1,0}, \infty] \times [\tilde\vartheta_{2,0}, \infty] \times \cdots$$

where, for example, $\tilde\vartheta_{1,0} < \vartheta_{1,0}$ and $\tilde\vartheta_{2,0} < \vartheta_{2,0}$.

Alternatively or additionally, the union of the critical subset and the subcritical subset may be the complement of a second Cartesian product $$[-\infty, \tilde\vartheta_{1,0}] \times [-\infty, \tilde\vartheta_{2,0}] \times \cdots$$

Here, for example at least one subsystem may include a near-assessment error (cf. associated third predetermined subcriterion).

An assessment error may be present in a subsystem 220, 221 when a portion of the time series of suberror measure TPI1, TPI2 meets an associated second predetermined subcriterion. The particular second predetermined subcriteria may result from boundary hypersurfaces of the first Cartesian product (for example, $\vartheta_1 \geq \vartheta_{1,0}$, where, for example, $\vartheta_1$ is suberror measure TP1 in the first subsystem). In other words, for example for each subsystem the associated second predetermined subcriterion may be met when the suberror measure exceeds an associated second predetermined subthreshold value ($\vartheta_{1,0}$, $\vartheta_{2,0}$) Alternatively or additionally, the second predetermined subcriterion in a subsystem may be met when the associated time series of suberror measure TPI includes a local extreme (for example, a maximum above a further associated second subthreshold value).

In addition, a near-assessment error may be present in a subsystem 220, 221 when a portion (for example, the most recent point in time or the most recent three points in time of the time series) of the time series of suberror measure TPI1, TPI2 meets an associated third predetermined subcriterion, but not the associated second predetermined subcriterion. The particular third predetermined subcriteria may result from boundary hypersurfaces of the difference between the first and second Cartesian products (for example, $\tilde{\vartheta}_{1,0} \leq \vartheta_1 < \vartheta_{1,0}$) In other words, for example for each subsystem, the associated third predetermined subcriterion may be met when the suberror measure exceeds an associated third predetermined subthreshold value $\tilde{\vartheta}_{1,0}$, $\tilde{\vartheta}_{2,0}$, but not associated second subthreshold value $\vartheta_{1,0}$, $\vartheta_{2,0}$. Alternatively or additionally, the third predetermined subcriterion in a subsystem may be met when the associated time series of the suberror measure TPI includes a local extreme (for example, a maximum above a further associated third subthreshold value).

Method 100, 101 may also include identifying 141, for each subsystem 220, 221 of system 200, at least one near-assessment error. Alternatively or additionally, method 100, 101 may include identifying 141, for each subsystem 220, 221 of system 200, at least one assessment error. As already explained, assessment errors in subsystems are not necessarily as infrequent as false negatives.

The at least one (or further) near-assessment error(s) of a subsystem 220, 221 may be used in a diagnosis during operation of system 200, in particular during operation of subsystem 220, 221 of system 200. Alternatively or additionally, the at least one (or further) assessment error(s) of a subsystem 220, 221 may be used in the diagnosis during operation of system 200, in particular during operation of subsystem 220, 221 of system 200. The diagnosis may thus take place at the subsystem level. For example, a subsystem may be deactivated if necessary.

Method 100, 101 may also include modeling 151, for each subsystem 220, 221 of system 200, a functional relationship for a (univariate) distribution function of suberror measures TPI1, TPI2 of subsystem 220, 221 (i.e., for each component of the vector of the suberror measures), or for a (univariate) density function of the suberror measures of the subsystem, based on the at least one near-assessment error and/or the at least one assessment error in subsystem 220, 221. For example, for each subsystem, parameters of a parametric (univariate) distribution function may be adapted to the at least one near-assessment error and/or in practice, to a plurality of near-assessment errors. Alternatively or additionally, the at least one assessment error in the subsystem and/or optionally a plurality of assessment errors may be taken into account in this adaptation of the parameters. The same as with modeling 150 the functional relationship for the distribution function (or density function) of error measures, a functional relationship for the (univariate) distribution function (or density function) of suberror measures of a subsystem may be a parameterizable statistical model, optionally a parameterizable statistical model from extreme value theory.

Method 100, 101 may also include identifying 153 at least one subsystem 220, 221 in need of optimization, based on the distribution functions of suberror measures for each subsystem 220, 221.

Method 100, 101 may also include computing 152 a functional relationship for a (multivariate) distribution function of vectors of suberror measures, based on the distribution functions of subsystems 220, 221 of system 200. Computing 152 the functional relationship for the (multivariate) distribution function of vectors of suberror measures may take place according to Sklar's theorem. An unambiguous multivariate distribution function of vectors of suberror measures (via a copula, for example) may result under mild prerequisites. Alternatively, the (multivariate) distribution function of vectors of suberror measures may be computed without previous computation of the (univariate) distribution function for each subsystem.

The following statements may relate to computing 152 the functional relationship for the (multivariate) distribution function of vectors of suberror measures:

Specifically, the objective is model formation for a statistical extrapolation of a vector-valued error measure on a continuous scale (in contrast to the discrete counting of the occurrence of false negatives according to the related art, and in an extension of or as an alternative to computer-implemented method 100 (according to the first aspect)). Each of the subsystems in the fusion system, for example, may be represented by a component in the overall system TPI, and each vector component may per se form a one-dimensional error measure (subsystem TPI) for the associated subsystem. In addition, each subsystem TPI may be defined in such a way that the exceedance of a specific, known (possibly individual) threshold value corresponds to the occurrence of an assessment error in this subsystem. In the case considered here, an assessment error may also occur only infrequently in the individual subsystems, for example, so that assessment errors in a subsystem sometimes cannot be observed in the collected data. (Although assessment errors at the subsystem level may certainly be apparent in the data, false negatives are not likely to be expected.) It is not mandatory to expect that assessment errors will occur in subsystems; however, when they do occur, it is to be expected that they have not manifested as false negatives within the existing data material. Accordingly, the same as in the statistical extrapolation of previous method 100 (according to the first aspect), extreme value models may likewise be assumed for the statistical description of the individual suberror measures. (The case that some subsystems more frequently deliver an error event for which no extrapolation is necessary may also be taken into account, for example by combining multiple subsystems into a "virtual" subsystem having infrequent errors, or for example by initially modeling the remaining subsystems as described below, and subsequently integrating the subsystems with more frequent errors into the overall argument, for example as additional dimensions in the overall model.) As a result, however, it does not mean that it is possible to draw conclusions concerning the false negative likelihood (or false negative rate) of the fusion systems as a whole.

In the above example of an OR fusion for an AEB, for example, it is possible that the radar subsystem and the video subsystem, each taken by itself, makes an unjustified non-triggering decision so infrequently that such subsystem errors (i.e., assessment errors in the subsystem) cannot be observed in the recorded data. However, it may still be expected that both subsystems will have a specific number of near-assessment errors (i.e., a subsystem wrongly does not prepare for a triggering) that may be utilized for the extrapolation. It is true that in each case the assessment error frequencies of the radar subsystem or of the video subsystem may be estimated per se via separate one-dimensional extrapolations, as in the previous method (according to the first aspect or a specific embodiment thereof). However, no statement is thus obtained about how frequently both subsystems simultaneously make an error, and only in this case a false negative would result in this fusion system. To allow conclusions to be drawn concerning the false negative rate of the overall system, the stochastic dependencies (often expressed by so-called copulas) between the individual suberror measures are also incorporated into the model formation, with a focus on the extreme range. This may be the range, for example, in which (at least one/) a subsystem includes a (near-)assessment error. Based on mathematical-statistical limit theorems, the asymptotic dependency structure within a random vector may be derived in the extreme range under lenient prerequisites. A multivariate extreme value distribution (analogous to the one-dimensional block maxima method in previous method 100), a multivariate generalized Pareto distribution (analogous to the one-dimensional peaks-over-threshold method in previous method 100), or a distribution in the so-called domain of attraction of such a distribution may be approximately ascertained in this way. All of these distributions share the common feature that the stochastic dependencies may be expressed or approximated by a central model component which, depending on the source, has different equivalent forms of representation that are known under the terms "D norm," "stable tail dependence function," "Pickands dependence function," "max-stable copula," "extreme value copula," "generalized Pareto copula," "exponent measure," "spectral measure," "angular measure," and "(multivariate) regular varying function," for example. These types of models may be used to describe the dependency structure of vector-valued overall system TPIs in the extreme range.

As a result, the stochastic overall model for the overall system TPI may include the one-dimensional extrapolation models for the individual subsystem TPIs (analogous to previous method 100) and/or the dependency model (the significant extension in comparison to the previous method (according to the first aspect or a specific embodiment thereof)), which describes the (stochastic) interaction between the individual subsystems and in particular is tailored to the extreme range of a distribution. This overall model may be adapted to the existing data set (for example, adaptation to the subcritical events) and utilized for the extrapolation (in step 161, for example) from the subcritical subset to the critical subset.

Method 100, 101 may also include computing 161 a further false negative rate (i.e., a further estimator for the false negative rate) based on the distribution function of vectors of suberror measures over the critical subset. The further false negative rate may be utilized in the same way as the false negative rate according to method 100 (according to the first aspect), for example for a comparison with other systems.

The same as in method 100 (according to the first aspect), method 100, 101 may also include checking 171 whether the further false negative rate meets a further fourth predetermined criterion. Method 100, 101 may also include enabling 181 the functionality of system 200 when the further false negative rate (and/or an upper limit of a confidence interval for the further false negative rate) meets the further fourth predetermined criterion, the further fourth predetermined criterion optionally being met when the further false negative rate (and/or the upper limit of the confidence interval for the further false negative rate) is less than a further predetermined allowable rate. The further predetermined allowable rate may be the predetermined allowable rate.

The overall model may be estimated in a stepwise manner, for example (via its individual components) or may be estimated as a whole. Even if the overall model is viewed as a unit, the described aspects are generally at least implicitly present. Alternatively, individual distribution functions of the suberror measures or the copula may also be described by other models that do not necessarily originate from the extreme value theory context.

In one alternative specific embodiment of method 100, 101, a false negative may be present when a portion of the time series of the vector of suberror measures (i.e., the overall system TPI) meets a/the second predetermined criterion, it being optionally possible for the second predetermined criterion to result from boundary hypersurfaces of the first Cartesian product. In other words, the second predetermined criterion is, for example, that a portion of the time series of the vector of suberror measures is present in the critical subset (in the first Cartesian product, for example). A near-false negative may be present when a portion of the time series of the vector of suberror measures (i.e., the overall system TPI) meets a/the third predetermined criterion, but not the second predetermined criterion, it being optionally possible for the third predetermined criterion to result from boundary hypersurfaces of the difference between the first and second Cartesian products. In other words, the third predetermined criterion is, for example, that a portion of the time series of the vector of suberror measures is present in the subcritical subset.

Method 100, 101 may also include computing a functional relationship for a (multivariate) distribution function of vectors of suberror measures, at least based on the at least one near-false negative. Alternatively or additionally, computing the functional relationship for the (multivariate) distribution function may be based on the at least one false negative (if present). Alternatively or additionally, computing the functional relationship for the (multivariate) distribution function may be based on at least one assessment error in a subsystem (if present). Alternatively or additionally, computing the functional relationship for the (multivariate) distribution function may be based on at least one near-assessment error in a subsystem (if present). In other words, it is then not necessary here, for example, for the univariate distributions for the suberror measures to be computed for each subsystem of the system. However, the univariate distributions for the suberror measures may be computed for each subsystem of the system (if necessary) from the multivariate distribution function.

Also provided is a system 200 which is safeguarded according to computer-implemented method 100 (according to the first aspect or a specific embodiment thereof) and/or computer-implemented method 100, 101 (according to the second aspect) for safeguarding system 200 against false negatives. This safeguarding may take place, for example, during development within the scope of the enabling. Alternatively or additionally, the safeguarding may take place by diagnosis during operation of the system.

At least one computer program is provided which is designed to carry out computer-implemented method 100 (according to the first aspect or a specific embodiment thereof) or computer-implemented method 100, 101 (according to the second aspect) for safeguarding system 200 against false negatives. The computer program may be present in interpretable form or in compiled form. For the execution, the computer program may be loaded as a bit sequence or byte sequence into the RAM of a control device or computer.

Also provided is a computer-readable medium or signal that stores and/or contains the computer program. The medium may include a RAM, ROM, EPROM, etc., in which the signal is stored.

Also provided is a computer system that is designed to execute the computer program. The computer system may in particular include at least one processor and at least one working memory. The computer system may also include a memory.

Computer-implemented method 100 (according to the first aspect or a specific embodiment thereof) or computer-implemented method 100, 101 (according to the second aspect) for safeguarding system 200 against false negatives may include one or multiple user input algorithms, the one or multiple user input algorithm(s) (each) being designed to prompt and/or receive a user input from a user (for example, via a user interface of the control unit or computer). The methods may be adapted via user inputs (in contrast to hard-coded parameters). The safeguarding may be improved in this way. A user input may, for example, involve the adaptation of a statistical model to the data: For example, the threshold value above which the subcritical events start is generally selected according to specific criteria in such a way that the model assumptions are met as well as possible. A similar procedure may be carried out for methods that manage without threshold values; in that case, it is generally decided how many pieces of data from the extreme range are incorporated into the model adaptation. It is possible for this decision, however, to have to be made for a given system only once; in this case a "hard" implementation of just this exact threshold for this one system would be possible, and possibly also the transfer of this threshold to (very) similar systems.

What is claimed is:

1. A computer-implemented method for safeguarding a driving system of a vehicle against false negatives, comprising:
   detecting, by at least one sensor, surroundings of the vehicle;
   generating at least one time series of data representing the detected surroundings;
   determining a time series of a criticality based on the at least one time series of data, the driving system including a functionality that is triggered when the criticality meets a first predetermined criterion, the functionality including an intervention in guidance of the vehicle;
   computing a time series of a reference, the reference being a comparison criticality for a triggering of the functionality of the system;
   computing a time series of an error measure at least based on the time series of the criticality and the time series of the reference, a non-triggering of the functionality of the system being classified as a false negative when a portion of the time series of the error measure meets a second predetermined criterion;
   identifying at least one near-false negative, a non-triggering of the functionality of the system being classified as a near-false negative when a portion of the time series of the error measure meets a third predetermined criterion, but not the second predetermined criterion; and
   displaying in the vehicle a warning based on the identifying the at least one near-false negative.

2. The method as recited in claim 1, wherein the time series of the criticality and/or the time series of the reference and/or the time series of the error measure, is continuous.

3. The method as recited in claim 1, wherein the at least one near-false negative is used in a diagnosis during operation of the system.

4. The method as recited in claim 1, wherein the system is a driving system of a vehicle.

5. The method as recited in claim 4, wherein the driving system is a driver assistance system or an automated driving system or a highly automated driving system.

6. The method as recited in claim 1, further comprising:
   modeling a functional relationship for a distribution function of error measures, at least based on the at least one near-false negative;
   computing a false negative rate based on the distribution function of the error measures over a set of error measures over which the second predetermined criterion is met.

7. The method as recited in claim 6, further comprising:
   checking whether the false negative rate meets a fourth predetermined criterion;
   enabling the functionality of the system when the false negative rate meets the fourth predetermined criterion, the fourth predetermined criterion being met when the false negative rate is less than a predetermined allowable rate.

8. The method as recited in claim 1, further comprising:
   receiving a data time recording of the system, the data time recording including at least one time series of data that is based on measurement using a sensor system of the system.

9. The method as recited in claim 8, further comprising:
   receiving a further data time recording, the further data time recording including at least one further time series of data that is based on further measurement using a further sensor system;
   forming an overall data time recording from the data time recording and/or the further data time recording; and
   computing the time series of the reference being based on the overall data time recording, wherein, at each point in time of the time series, the reference is a function of data of the overall data time recording at a same point in time, at at least one previous point in time, or at at least one subsequent point in time.

10. The method as recited in claim 1, wherein computing of the time series of the error measure includes:
    computing the time series of the error measure in such a way that at at least one point in time of the time series, the error measure is a function of different points in time of the time series for the criticality and for the reference.

11. A computer-implemented method for safeguarding a driving system of a vehicle against false negatives, the driving system including a functionality that is triggered when a criticality meets a first predetermined criterion, the functionality including an intervention in guidance of the vehicle, and the driving system including a system of subsystems that includes at least one subsystem, the method comprising:

detecting, by at least one sensor, surroundings of the vehicle;

generating at least one time series of data representing the detected surroundings;

determining, for each subsystem of the system, a time series of a subcriticality based on the at least one time series of data, the criticality being a function of subcriticalities of the subsystems of the system, the criticality being a function of whether or to what extent at least one subcriticality meets an associated first predetermined subcriterion;

computing, for each subsystem of the system, a time series of a subreference, each subreference being a comparison subcriticality for the subcriticality of the subsystem, at least one time series of a subreference being the time series of a reference; and computing, for each subsystem of the system, a time series of a suberror measure at least based on the time series of the subcriticality of the subsystem and the time series of the subreference of the subsystem, a time series of a vector of suberror measures being generated, wherein a critical subset that corresponds to a false negative is defined in a vector space that is spanned by vectors of suberror measures, the critical subset being a first Cartesian product.

12. The method as recited in claim 11, wherein a subcritical subset in the vector space that is spanned by the vector suberror measures is defined in such a way that each element of one or more elements of the subcritical subset is not an element of the critical subset, but is within a predetermined distance of at least one element of the critical subset, a union of the critical subset and the subcritical subset being a second Cartesian product.

13. The method as recited in claim 12, wherein an assessment error in a subsystem is present when a portion of the time series of the suberror measure meets an associated second predetermined subcriterion, the associated second predetermined subcriteria resulting from boundary hypersurfaces of the first Cartesian product.

14. The method as recited in claim 13, wherein a near-assessment error in a subsystem is present when a portion of the time series of the suberror measure meets an associated third predetermined subcriterion, but not the associated second predetermined subcriterion, the associated third predetermined subcriteria resulting from boundary hypersurfaces of a difference between the first and second Cartesian products.

15. The method as recited in claim 14, further comprising:
    identifying, for each subsystem of the system, at least one near-assessment error and/or at least one assessment error.

16. The method as recited in claim 15, wherein the at least one near-assessment error and/or the at least one assessment error of a subsystem, is used in a diagnosis during operation of the subsystem of the system.

17. The method as recited in claim 15, further comprising:
    modeling, for each subsystem of the system, a functional relationship for a distribution function of suberror measures of the subsystem, based on the at least one near-assessment error and/or the at least one assessment error in the subsystem; and identifying at least one subsystem in need of optimization, based on the distribution functions of suberror measures for each subsystem.

18. The method as recited in claim 17, further comprising:
    computing a functional relationship for a distribution function of vectors of suberror measures, based on the distribution functions of the subsystems of the system.

19. The method as recited in claim 18, further comprising:
    computing a further false negative rate based on the distribution function of vectors of suberror measures over the critical subset.

20. The method as recited in claim 19, further comprising:
    checking whether the further false negative rate meets a further fourth predetermined criterion; and enabling the functionality of the system when the further false negative rate meets the further fourth predetermined criterion, the further fourth predetermined criterion being met when the further false negative rate is less than a further predetermined allowable rate.

21. A driving system of a vehicle that is safeguarded against false negatives, the driving system including a computer system including a processor and memory, the computer system configured to:

detect, using at least one sensor, surroundings of the vehicle;

generate at least one time series of data representing the detected surroundings;

determine a time series of a criticality based on the at least one time series of data, the driving system including a functionality that is triggered when the criticality meets a first predetermined criterion, the functionality including an intervention in the guidance of the vehicle;

compute a time series of a reference, the reference being a comparison criticality for a triggering of the functionality of the system;

compute a time series of an error measure at least based on the time series of the criticality and the time series of the reference, a non-triggering of the functionality of the system being classified as a false negative when a portion of the time series of the error measure meets a second predetermined criterion;

identify at least one near-false negative, a non-triggering of the functionality of the system being classified as a near-false negative when a portion of the time series of the error measure meets a third predetermined criterion, but not the second predetermined criterion; and display in the vehicle a warning based on the identifying the at least one near-false negative.

\* \* \* \* \*